United States Patent
Usami

[11] Patent Number: 5,960,110
[45] Date of Patent: Sep. 28, 1999

[54] METHOD OF ESTABLISHING CONVERSION RELATIONSHIP FOR COLOR PREDICTION

[75] Inventor: Yoshinori Usami, Minamiashigara, Japan

[73] Assignee: Fuji Photo Film Co., Ltd., Kanagawa-ken, Japan

[21] Appl. No.: 08/950,076

[22] Filed: Oct. 14, 1997

[30] Foreign Application Priority Data

Oct. 15, 1996 [JP] Japan .................................. 8-272704
Oct. 31, 1996 [JP] Japan .................................. 8-290665

[51] Int. Cl.$^6$ .............................. G06K 9/00; H04N 1/60
[52] U.S. Cl. ........................................... 382/167; 358/518
[58] Field of Search ................................. 382/162, 166, 382/167; 358/515, 518, 520, 523–525; 345/431

[56] References Cited

U.S. PATENT DOCUMENTS

| | | | |
|---|---|---|---|
| 5,233,412 | 8/1993 | Nishihara | 358/518 |
| 5,539,522 | 7/1996 | Yoshida | 358/518 |
| 5,563,724 | 10/1996 | Boll et al. | 358/518 |
| 5,619,348 | 4/1997 | Tokai | 358/518 |

FOREIGN PATENT DOCUMENTS

| | | | |
|---|---|---|---|
| 54-39762 | 11/1979 | Japan | G03F 3/00 |
| 2-11356 | 1/1990 | Japan | B41J 2/525 |
| 3-202978 | 9/1991 | Japan | G06F 15/70 |
| 4-337965 | 11/1992 | Japan | H04N 1/40 |

*Primary Examiner*—Leo H. Boudreau
*Assistant Examiner*—Bhavesh Mehta
*Attorney, Agent, or Firm*—Sughrue, Mion, Zinn, Macpeak & Seas, PLLC

[57] ABSTRACT

First colorimetric data with respect to device data C, M, Y with device data K=0 % are determined as a first color-predicting LUT, and second colorimetric data with respect to rough device data C, M, Y, K are determined as second color-predicting LUT. Third calorimetric data with respect to device data C, M, Y, K having the same device data K are predicted from the second colorimetric data. A third color-predicting LUT representing a relationship of the third colorimetric data to the device data C, M, Y, K is determined from the third calorimetric data. The first, second, and third color-predicting LUTs are established as a desired color-predicting conversion relationship.

22 Claims, 10 Drawing Sheets

METHOD OF ESTABLISHING CONVERSION RELATIONSHIP FOR COLOR PREDICTION

BACKGROUND OF THE INVENTION

1. Field of the Invention

The present invention relates to a method of establishing a conversion relationship for predicting color reproducibility characteristics of color images that are printed.

2. Description of the Related Art

Printing machines or color printers generally generate color images by processing device data such as halftone dot % data of C, M, Y, K or density data of R, G, B for area modulation or density modulation on image support mediums.

Color reproducibility characteristics of color images that are printed on image support mediums depend on output conditions including color materials used, medium properties, etc. Even when only a particular output condition is varied, it is not an easy task to predict colors which will finally be reproduced on an image support medium, i.e., to predict color reproducibility characteristics of a final color image.

It has heretofore been customary to output a color chart comprising a plurality of patches on an image support medium based on known device data, measure calorimetric values of the patches, and thereafter carry out interpolating calculations to determine a color-predicting conversion relationship which is a relationship between device data with respect to particular output conditions and colorimetric values of a finally finished color image, i.e., a color-predicting function (mapping function) or a color-predicting lookup table (mapping lookup table) for converting C, M, Y, K or R, G, B values into colorimetric values. For determining a highly accurate color-predicting conversion relationship, it is necessary to output as many patches as possible and measure calorimetric values of those patches. However, since such a procedure must be effected for each of various combinations of output conditions, the conventional process of determining a highly accurate color-predicting conversion relationship has been highly time-consuming and tedious.

To eliminate the above drawbacks, there has been proposed a process for determining a correlation between halftone dot % values of an arbitrary patch and their colorimetric values by optimization of explanatory variables of multiple regression equations (see Japanese laid-open patent publication No. 4-337965). The proposed process requires the tasks of generating a considerable number of patches, measure colorimetric data of the patches, and generate the function, and hence is not necessarily so efficient as to solve the above drawbacks. It is practically infeasible to determine in advance a color-predicting conversion relationship with respect to all output conditions because there are many output conditions to be taken into account when prints are produced.

According to other proposed processes, a color-predicting function is defined by a theoretical formula which physically simulates basic output conditions in order to reduce efforts needed to output and colorimetrically measure patches (see Japanese patent publication No. 54-39762 and Japanese laid-open patent publications Nos. 2-11356 and 3-202978). These processes are tedious and time-consuming because it is necessary to determine various parameters of the color-predicting function by way of elaborate experimentation. In addition, calculations based on the color-predicting function are complicated.

SUMMARY OF THE INVENTION

It is a major object of the present invention to provide a method of establishing a conversion relationship for predicting color reproducibility characteristics of color images under desired output conditions, highly accurately and easily from data of a highly reduced number of measuring points.

Another object of the present invention is to provide a method of establishing a conversion relationship for predicting color reproducibility characteristics of color images under various output conditions, highly accurately and easily using a reference conversion relationship.

The above and other objects, features, and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
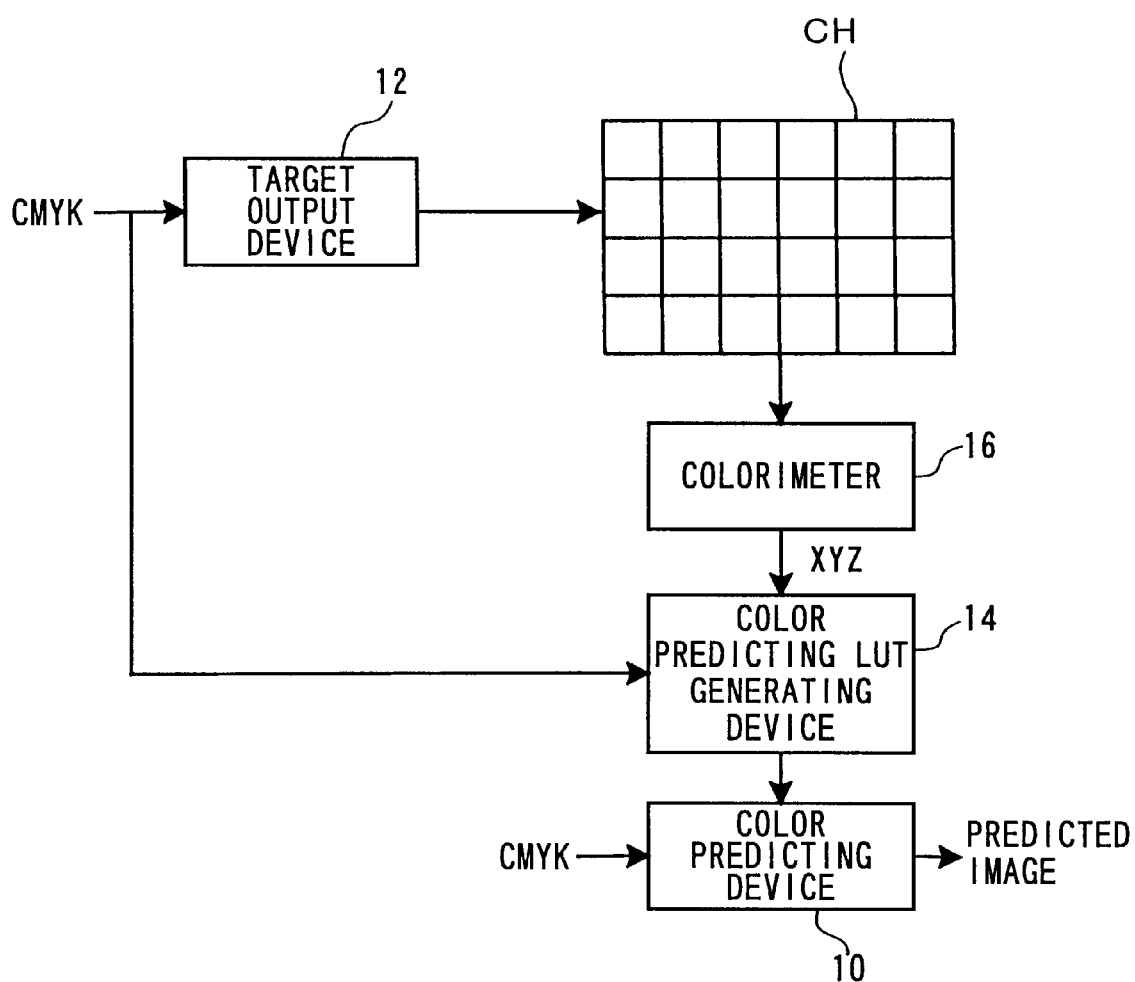
FIG. 1 is a block diagram of an apparatus which carries out a method of establishing a color-predicting conversion relationship according to a first embodiment of the present invention.

As shown in FIG. 1, an apparatus which carries out a method of establishing a color-predicting conversion relationship according to a first embodiment of the present invention includes a color predicting device 10 which predicts colors (color reproducibility characteristics) of a color image that is generated by a target output device 12 such as a printing machine, a color printer, etc. by outputting a predicted image using a color-predicting lookup table (hereinafter referred to as a color-predicting LUTE) generated by a color-predicting lookup table generating device 14 (hereinafter referred to as a "color-predicting LUT generating device 14").

The color-predicting LUT, which represents a color-predicting conversion relationship, is generally generated as follows: The target output device 12 outputs a color chart CH comprising a plurality of patches based on known device data C, M, Y, K (K=0%) and device data C, M, Y, K (K=n%) that are rougher than the above device data C, M, Y. The color chart CH is calorimetrically measured to produce first and second calorimetric data X, Y, Z of each of the patches. The color-predicting LUT generating device 14 estimates the relationship of third colorimetric data X, Y, Z with respect to the device data C, M, Y, K which are not outputted as patches, using the first and second calorimetric data X, Y, Z. Then, the color-predicting LUT generating device 14 determines a final color-predicting LUT with respect to arbitrary device data C, M, Y, K from the first through third colorimetric data X, Y, Z.

Figure 2:
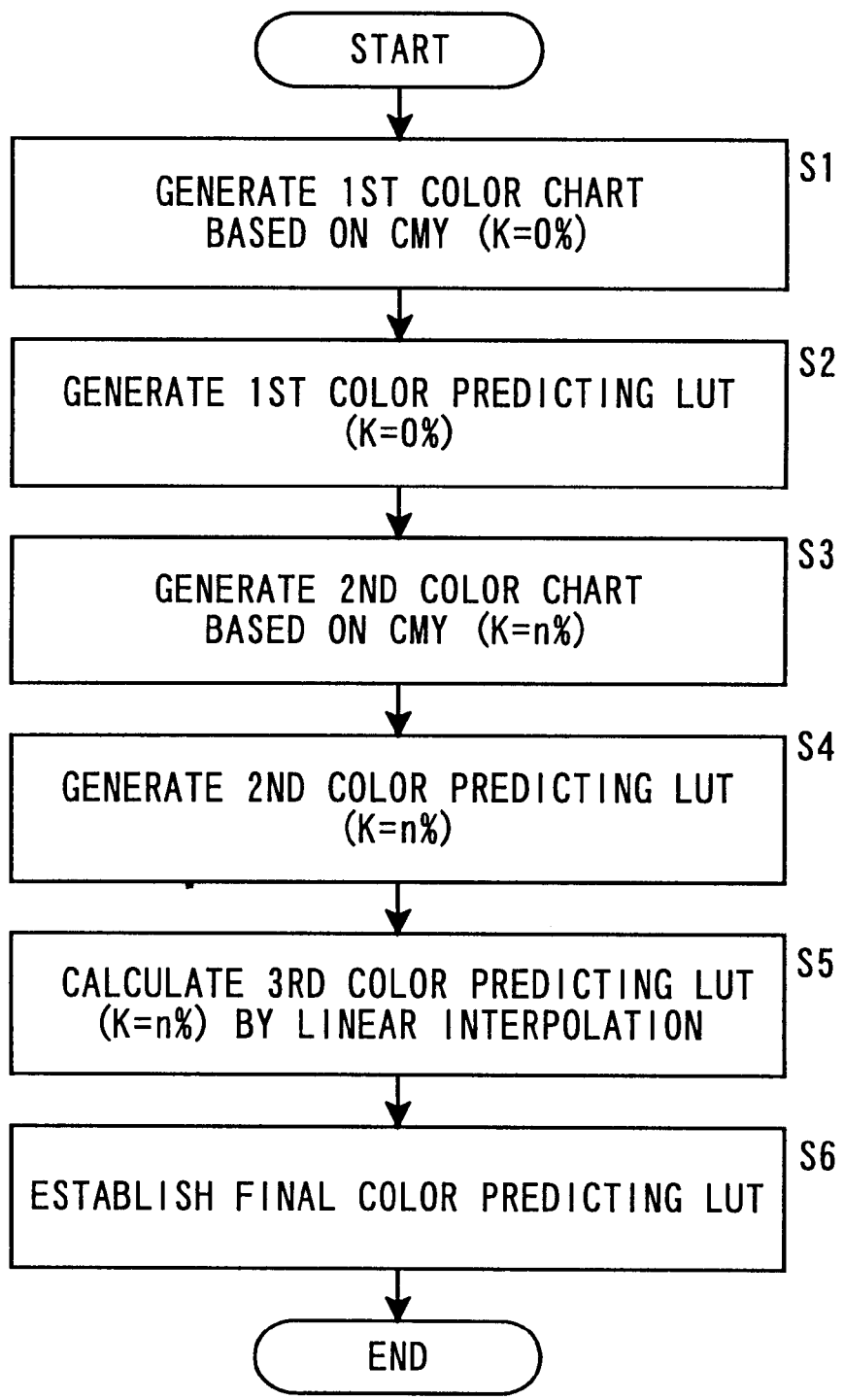
FIG. 2 is a flowchart of the method according to the first embodiment.

A process of establishing the color-predicting LUT will be described in detail below with reference to FIG. 2.

Output conditions such as an output sheet of paper, color materials, printing pressures, etc. for generating a desired color image are first established. Under the established output conditions, the target output device 12 outputs a first color chart comprising a plurality of patches based on device data C, M, Y, K (K=0%) of a given data pitch in a step S1. The device data C, M, Y are given as halftone dot % data in a combination of increments 0, 10, 20, . . . , 100%, for example.

The first color chart is then calorimetrically measured by a calorimeter 16 (see FIG. 1) to obtain first calorimetric data Xcmy0, Ycmy0, Zcmy0 which are stimulus value data X, Y, Z of each of the patches. The color-predicting LUT generating device 14 generates a first color-predicting LUT (K=0%) which represents the relationship of the first calorimetric data Xcmy0, Ycmy0, Zcmy0 to the device data C, M, Y, K (K=0 %) in a step S2.

Under the same output conditions, the target output device 12 outputs a second color chart comprising a plurality of patches based on device data C, M, Y, K (K=n% ≠0%) in a step S3. The device data K is expressed as any of step values 0, 10, 20, . . . , 100%, for example. Device data C, M, Y that are combined with the device data K contain the device data C, M, Y with respect to the first color chart and are established at rougher intervals insofar as there can be obtained a number of data that do not make solutions of multiple regression equations indefinite. The time required to obtain colorimetric data can greatly be reduced by thus reducing the number of patches. The first and second color charts may be generated simultaneously.

The generated second color chart is colorimetrically measured by the colorimeter 16 to obtain second calorimetric data Xcmyn, Ycmyn, Zcmyn. The color-predicting LUT generating device 14 generates a second color-predicting LUT (K=n%) which represents the relationship of the second colorimetric data Xcmyn, Ycmyn, Zcmyn to the device data C, M, Y, K (K=n%) in a step S4.

A detailed review of the relationship between the device data C, M, Y, K (K=0 %) and the device data C, M, Y, K (K=n%) has revealed the following fact:

It has been assumed that colorimetric data of the output sheet of paper to which the color chart is outputted are represented by Xp, Yp, Zp. Colorimetric data Xi, Yi, Zi (i: the number of a patch) of the patches of the color chart CH have been converted into luminance data Lx, Ly, Lz which are linear spatial data with respect to reflected luminances according to:

$$Lx = (Xi/Xp)^{1/3} \quad (1)$$

$$Ly = (Yi/Yp)^{1/3} \quad (2)$$

$$Lz = (Zi/Zp)^{1/3} \quad (3)$$

Figure 3:
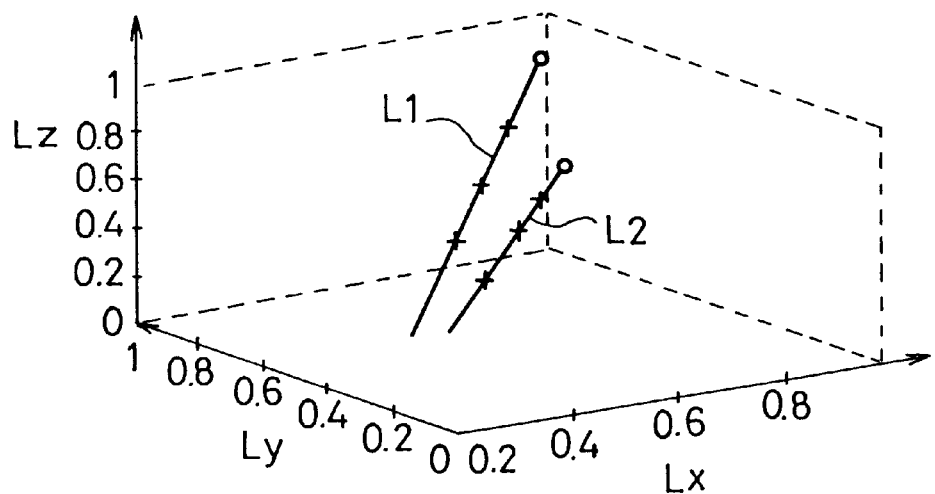
FIG. 3 is a diagram showing the relationship between luminance data when device data K is varied with respect to the same device data C, M, Y.

Luminance data Lx, Ly, Lz have been plotted with respect to device data c1, m1, y1, K (K=0, 10, . . . , 100%) and device data c2, m2, y2, K (K=0, 10, . . . , 100%). As a result, the relationship shown in FIG. 3 has been obtained. In FIG. 3, the symbol O represents luminance data Lx, Ly, Lz obtained from the device data c1, m1, y1, K (K=0%) and device data c2, m2, y2, K (K=0%), and the symbol "x" represents luminance data Lx, Ly, Lz obtained from the device data c1, m1, y1, K (K=n%) and device data c2, m2, y2, K (K=n%). Straight lines L1, L2 have been plotted by joining the luminance data Lx, Ly, Lz obtained from the same device data c1, m1, y1 and c2, m2, y2. Similar results have been obtained with respect to the other device data C, M, Y, K.

As a result, it has been found out that the luminance data Lx, Ly, Lz are linearly variable depending on the value of the device data K with respect to the same device data C, M, Y. It has also been found out that an increase in the luminance data Lx, Ly, Lz based on an increase in the device data K (K=n%) depends on the same device data C, M, Y, K (K=0%), i.e., depends on the amount of inks C, M, Y if printed with the inks, and is determined by the direction and magnitude of a vector whose origin is represented by the luminance data Lx, Ly, Lz with respect to the device data C, M, Y, K (K=0%).

Based on the latter finding, a third color-predicting LUT (K=n%.) which represents the relationship of third colorimetric data X, Y, Z with respect to remaining device data C, M, Y, K that have not been outputted as the first color chart (CMY (K=0%)) and the second color chart (CMY (K=n%)) is determined according to linear interpolation in a step S5.

A process of determining the third color-predicting LUT (K=n%) will be described below.

The first calorimetric data Xcmy0, Ycmy0, Zcmy0 with respect to the device data C, M, Y, K (K=0%) determined in the step S2 are converted into luminance data Lx(cmy0), Ly(cmy0), Lz(cmy0) which are first linear spatial data according to the following equation (4):

$$\begin{pmatrix} Lx(cmy0) \\ Ly(cmy0) \\ Lz(cmy0) \end{pmatrix} = \left[ \begin{pmatrix} Xcmy0 & 0 & 0 \\ 0 & Ycmy0 & 0 \\ 0 & 0 & Zcmy0 \end{pmatrix} \begin{pmatrix} 1/Xp \\ 1/Yp \\ 1/Zp \end{pmatrix} \right]^{1/3} \quad (4)$$

Similarly, the second colorimetric data Xcmyn, Ycmyn, Zcmyn with respect to the device data C, M, Y, K (K=n%) determined in the step S4 are converted into luminance data Lx(cmyn), Ly(cmyn), Lz(cmyn) which are second linear spatial data according to the following equation (5):

$$\begin{pmatrix} Lx(cmyn) \\ Ly(cmyn) \\ Lz(cmyn) \end{pmatrix} = \left[ \begin{pmatrix} Xcmyn & 0 & 0 \\ 0 & Ycmyn & 0 \\ 0 & 0 & Zcmyn \end{pmatrix} \begin{pmatrix} 1/Xp \\ 1/Yp \\ 1/Zp \end{pmatrix} \right]^{1/3} \quad (5)$$

Then, using the equation (6) given below, the luminance data Lx(cmyn), Ly(cmyn), Lz(cmyn) calculated by the equation (5) are standardized by the luminance data Lx(cmy0), Ly(cmy0), Lz(cmy0) calculated by the equation (4), producing luminance ratio data Sx(cmyn), Sy(cmyn), Sz(cmyn) which represent a luminance ratio of the device data C, M, Y, K (K=n%) to the device data C, M, Y, K (K=0%).

$$\begin{pmatrix} Sx(cmyn) \\ Sy(cmyn) \\ Sz(cmyn) \end{pmatrix} = \begin{pmatrix} Lx(cmyn) & 0 & 0 \\ 0 & Ly(cmyn) & 0 \\ 0 & 0 & Lz(cmyn) \end{pmatrix} \begin{pmatrix} 1/Lx(cmy0) \\ 1/Ly(cmy0) \\ 1/Lz(cmy0) \end{pmatrix} \quad (6)$$

Figure 4:
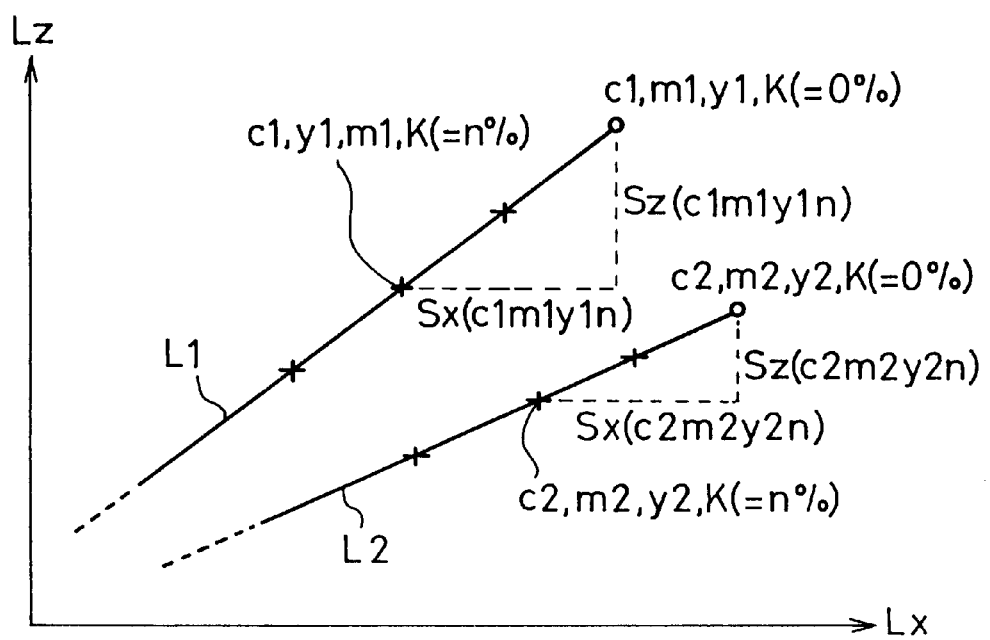
FIG. 4 is a diagram of a two-dimensional representation of the relationship shown in FIG. 3.

FIG. 4 shows luminance ratio data Sx(c1m1y1n), Sz(c1m1y1n) and Sx(c2m2y2n), Sz(c2m2y2n) with respect to the device data c1, m1, y1, K (K=n%) and c2, m2, y2, K (K=n%). Luminance ratio data Sy(c1m1y1n), Sy(c2m2y2n) are omitted from illustration as they are similar to the luminance ratio data Sx(c1m1y1n), Sz(c1m1y1n) and Sx(c2m2y2n), Sz(c2m2y2n). The luminance ratio data Sx(cmyn), Sy(cmyn), Sz(cmyn) calculated according to the equation (6) are indicative of components of a linear spatial vector extending from the luminance data Lx(cmy0), Ly(cmy0), Lz(cmy0) to the luminance data Lx(cmyn), Ly(cmyn), Lz(cmyn). As described above, the direction and magnitude of this linear spatial vector are determined by the reference device data C, M, Y, K (K=0%).

It is assumed that the luminance ratio data Sx(cmyn), Sy(cmyn), Sz(cmyn) are represented by matrixes Sxn, Syn, Szn, respectively, the device data C, M, Y, K (K=0%) by a matrix H0, and regression coefficients by Axn, Ayn, Azn. The relationship between these data can expressed by multiple regression equations (7)–(9) as follows:

$$Sxn = H \cdot Axn \quad (7)$$

$$Syn = H \cdot Ayn \quad (8)$$

$$Szn = H \cdot Azn \quad (9)$$

The matrixes Sxn, Syn, Szn, H, Axn, Ayn, Azn are defined according to equations (10)–(16) given below. In the equations (10)–(16), the number k of device data c1, m1, y1, K (K=n%)–ck, mk, yk, K (K=n%) represents a number of data which do not make the solutions of the multiple regression equations (10)–(16) indefinite. Specifically, the number k of device data may be greater (m+1) than the number m of rows of a matrix H according to to the equation (13).

$$Sxn = \begin{pmatrix} Sx(c1m1y1n) \\ Sx(c2m2y2n) \\ \vdots \\ Sx(ckmkykn) \end{pmatrix} \quad (10)$$

$$Syn = \begin{pmatrix} Sy(c1m1y1n) \\ Sy(c2m2y2n) \\ \vdots \\ Sy(ckmkykn) \end{pmatrix} \quad (11)$$

$$Szn = \begin{pmatrix} Sz(c1m1y1n) \\ Sz(c2m2y2n) \\ \vdots \\ Sz(ckmkykn) \end{pmatrix} \quad (12)$$

$$H = \begin{pmatrix} c1 & m1 & y1 & c1 \cdot m1 & c1 \cdot y1 & m1 \cdot y1 & c1 \cdot m1 \cdot y1 \\ c2 & m2 & y2 & c2 \cdot m2 & c2 \cdot y2 & m2 \cdot y2 & c2 \cdot m2 \cdot y2 \\ & & & & \cdots & & \\ ck & mk & yk & ck \cdot mk & ck \cdot yk & mk \cdot yk & ck \cdot mk \cdot yk \end{pmatrix} \quad (13)$$

$$Axn = \begin{pmatrix} axn(c) \\ axn(m) \\ axn(y) \\ axn(cm) \\ axn(cy) \\ axn(cmy) \\ \vdots \end{pmatrix} \quad (14)$$

$$Ayn = \begin{pmatrix} ayn(c) \\ ayn(m) \\ ayn(y) \\ ayn(cm) \\ ayn(cy) \\ ayn(cmy) \\ \vdots \end{pmatrix} \quad (15)$$

$$Azn = \begin{pmatrix} azn(c) \\ azn(m) \\ azn(y) \\ azn(cm) \\ azn(cy) \\ azn(cmy) \\ \vdots \end{pmatrix} \quad (16)$$

According to the equations (7)–(9), the regression coefficients axn(c), axn(m), ... represented by the matrixes Axn, Ayn, Azn are determined with respect to the device data K (K=10, 20, ..., 100%). If it is assumed that an error ex in a regular method of least squares is expressed by:

$$ex = \|Sxn - \langle Sxn \rangle\|^2 \quad (17)$$

then the matrix Axn can be determined from a condition to minimize an error expressed by:

$$\partial ex / \partial Axn = -2 \cdot H^t \cdot (Sxn - H \cdot Axn) = 0 \quad (18)$$

The matrix Axn is determined from the equation (18) as follows:

$$Axn = (H^t \cdot H)^{-1} \cdot H^t \cdot Sxn \quad (19)$$

In the equation (19), "t" represents a transposed matrix, and "−1" represents an inverse matrix. Likewise, the matrixes Ayn, Azn are given as follows:

$$Ayn = (H^t \cdot H)^{-1} \cdot H^t \cdot Syn \quad (20)$$

$$Azn = (H^t \cdot H)^{-1} \cdot H^t \cdot Szn \quad (21)$$

Using the regression coefficients (see the equations (14)–(16)) of the matrixes Axn, Ayn, Azn thus determined, luminance ratio data Sx(cmyn), Sy(cmyn), Sz(cmyn) with respect to arbitrary device data C, M, Y combined with the device data K (K=n%) can be determined using the equations (7)–(9).

The luminance ratio data Sx(cmyn), Sy(cmyn), Sz(cmyn) thus determined are converted into luminance data Lx(cmyn), Ly(cmyn), Lz(cmyn) according to the equation (6), which are then converted into third calorimetric data Xcmyn, Ycmyn, Zcmyn according to the equation (5). The relationship of the third calorimetric data Xcmyn, Ycmyn, Zcmyn to the device data C, M, Y, K (K=n%) is determined as third color-predicting LUT (K=n%).

A final color-predicting LUT capable of converting arbitrary device data C, M, Y, K into colorimetric data X, Y, Z is now established from the first color-predicting LUT (K=0%), the second color-predicting LUT (K=n%), and the third color-predicting LUT (K=n%) in a step S6.

In the first embodiment described above, the color-predicting LUT is determined. However, the equations (5)–(9) may be established in the color-predicting device 10, and colorimetric data X, Y, Z may successively be calculated from the color-predicting function when arbitrary device data C, M, Y, K as image data are given.

Figure 5:
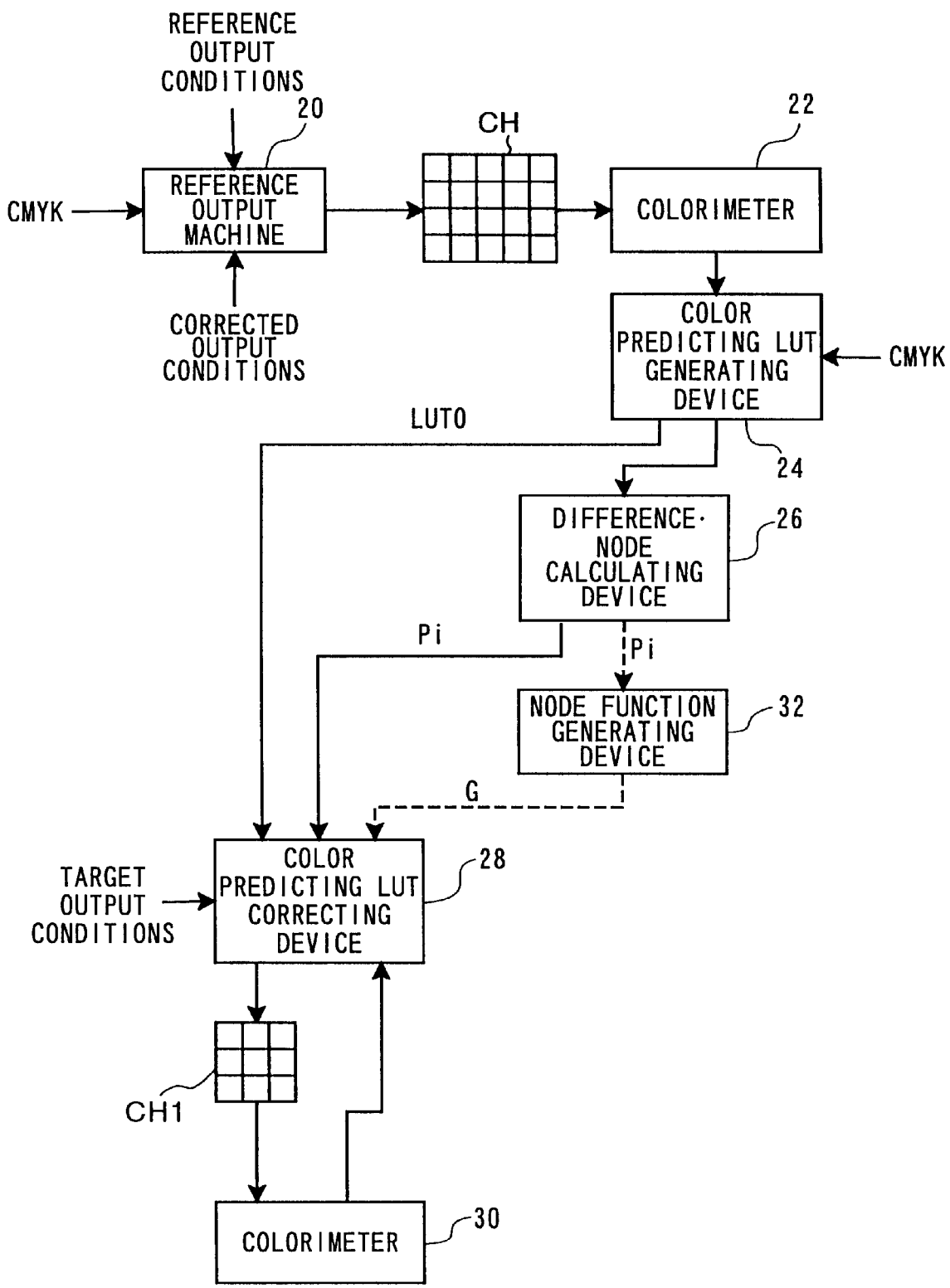
FIG. 5 is a block diagram of an apparatus which carries out a method of establishing a color-predicting conversion relationship according to a second embodiment of the present invention.
Figure 6:
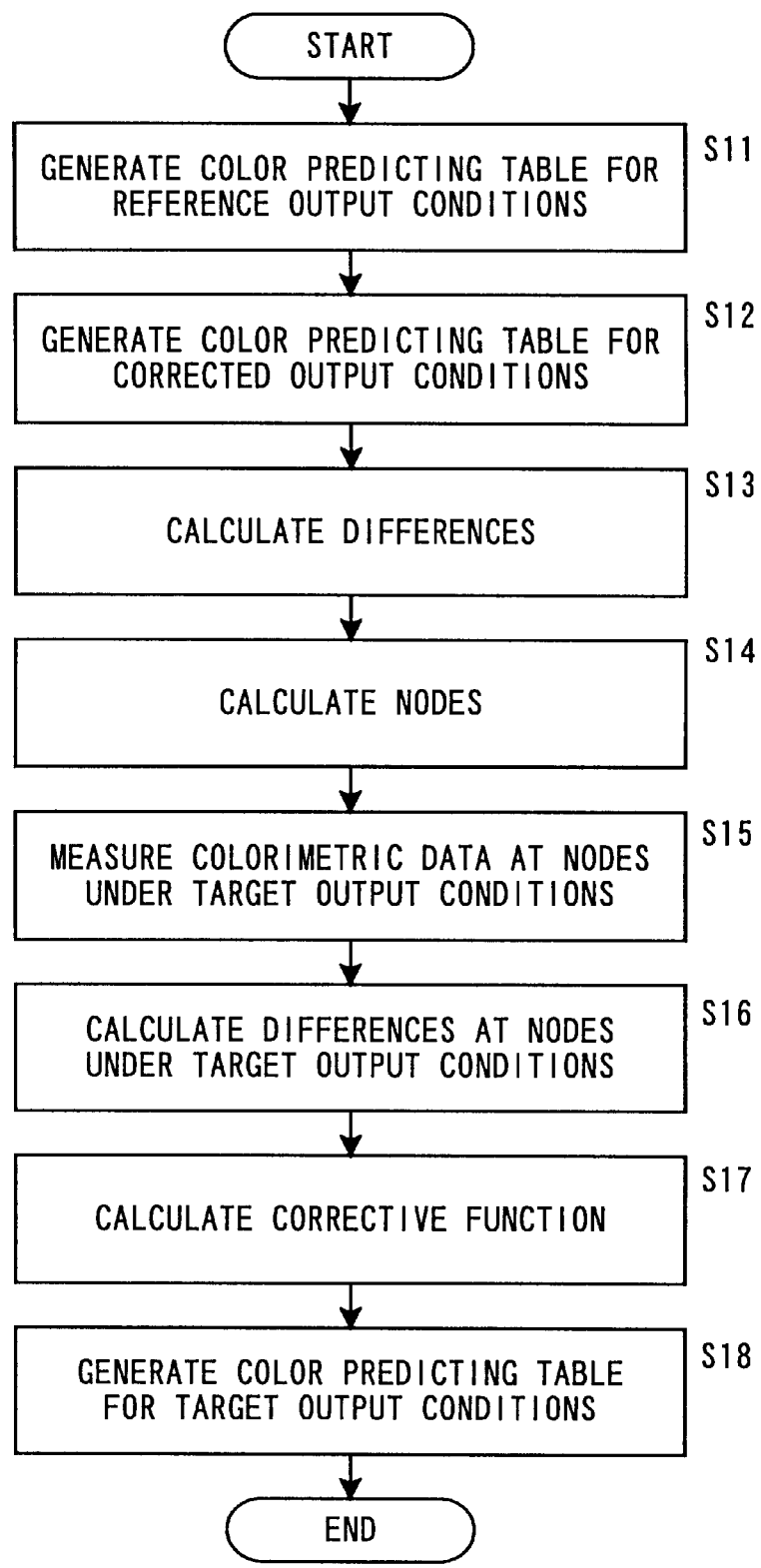
FIG. 6 is a flowchart of a first alternative sequence of the method according to the second embodiment.

FIG. 5 shows in block form an apparatus which carries out a method of establishing a color-predicting conversion relationship according to a second embodiment of the present invention. A first alternative sequence of the method of establishing a color-predicting conversion relationship according to the second embodiment will be described below with reference to FIG. 5 and a flowchart shown in FIG. 6.

A reference output machine 20 such as a printing machine for generating desired color images is set to reference output conditions including a print sheet of paper, inks, printing pressures, printing densities, etc., and generates a color chart CH based on known device data C, M, Y, K under the reference output conditions. A plurality of patches of the color chart CH are then colorimetrically measured by a colorimeter 22. A color-predicting LUT generating device 24 then determines the relationship of calorimetric data X, Y, Z (reference colorimetric data) to the device data C, M, Y, K as a color-predicting LUT0 which represents a reference color-predicting conversion relationship in a step S11.

Similarly, the reference output machine 20 is set to a plurality of corrected output conditions produced by modifying a particular output condition among the reference output conditions, e.g., the printing densities. Under the corrected output conditions, the reference output machine 20 generates a color chart CH based on known device data C, M, Y, K. The color chart CH is then calorimetrically measured by the calorimeter 22. The color-predicting LUT generating device 24 then generates color-predicting LUT1, LUT2, . . . with respect to the corrected output conditions in a step S12.

Figure 7:
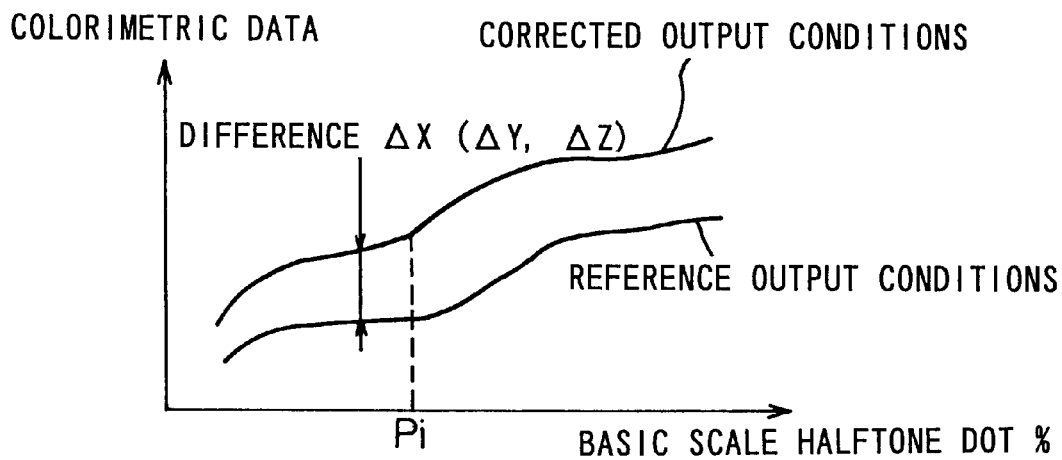
FIG. 7 is a diagram showing the relationship between colorimetric data and basic scale halftone dot % under corrected output conditions and reference output conditions.

Then, a difference-node calculating device 26 selects one of the device data C, M, Y, K or one of their combined data C·M, C·Y, M·Y, C·M·Y as a basic scale, and determines the relationship between device data (e.g., halftone dot %) of the basic scale and their colorimetric data X, Y, Z (reference colorimetric data and corrected calorimetric data) with respect to the reference output conditions and the corrected output conditions from the color-predicting LUT0, LUT1, LUT2, . . . FIG. 7 shows the relationship determined using the color-predicting LUT0 with respect to the reference output conditions, and the relationship determined using the color-predicting LUT1 with respect to one of the corrected output conditions.

Figure 8:
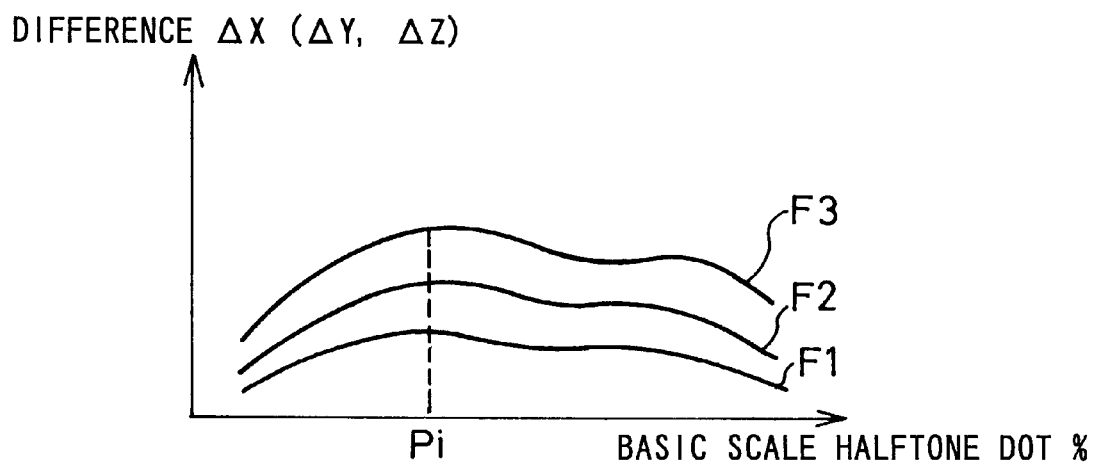
FIG. 8 is a diagram showing the relationship between colorimetric data differences and basic scale halftone dot % under corrected output conditions.

From the above determined relationship, differences $\Delta X$, $\Delta Y$, $\Delta Z$ (corrected differences) of the colorimetric data X, Y, Z which result from the modification of the particular output condition are determined in a step S13. These differences $\Delta X$, $\Delta Y$, $\Delta Z$ are determines as differences $\Delta X$, $\Delta Y$, $\Delta Z$ of each basic scale for the modified output condition. FIG. 8 shows differential functions F1, F2, F3, . . . produced by linearly interpolating the differences $\Delta X$, $\Delta Y$, $\Delta Z$ of the basic scale for the modified output condition.

Then, nodes Pi (i: the number of a node) where the differences $\Delta X$, $\Delta Y$, $\Delta Z$ vary characteristically with respect to the device data of the basic scale are determined in a step S14. The nodes Pi can be determined as points of inflection of the differential functions F1, F2, F3, . . . , i.e., device data where second partial derivatives of the differential functions F1, F2, F3, . . . with respect to the basic scale of the device data are nil. As a consequence, when a particular output condition among the reference output conditions is modified, device data C, M, Y, K where the calorimetric data X, Y, Z vary most characteristically can be determined for each basic scale.

Figure 9:
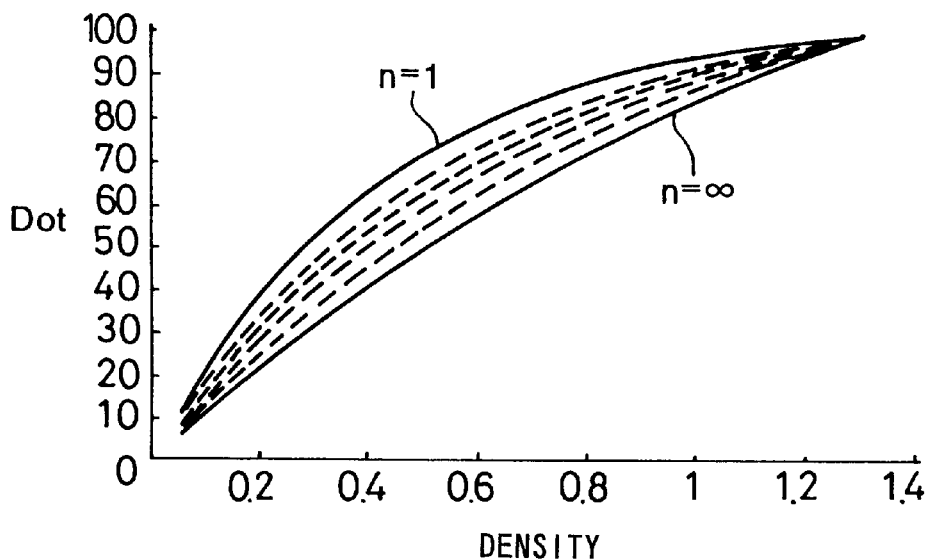
FIG. 9 is a diagram showing the relationship between analyzed halftone dot densities and effective halftone dot % according to the Yule formula.

The nodes Pi have been described as points where differences $\Delta X$, $\Delta Y$, $\Delta Z$ vary characteristically. However, the nodes Pi may be determined according to a theoretical formula if the modified output condition is a condition, such as printing densities, which causes a change in the dot gain. Specifically, between an analyzed halftone dot density Dt and effective halftone dot % Dot of a basic scale, there is a relationship represented by the following Yule equation (22):

$$Dot=(1-10^{-Dt/n})/(1-10^{-Ds/n}) \quad (22)$$

where Ds indicates the optical density of an ink-applied area of a printed document, the optical density depending on the thickness of the ink film, and n indicates a Yule coefficient depending on characteristics of the print sheet of paper. FIG. 9 shows effective halftone dot % Dot calculated by the Yule equation and plotted against densities, represented on the horizontal axis, of a document printed with halftone dot % of a basic scale. When n=1, the effective halftone dot % Dot is equivalent to the Murray-Davis equation which does not take any dot-gain correction into account. The greater the Yule coefficient n, the greater the gain correction intensity. Stated otherwise, the value of the Yule coefficient n determined for effective halftone dot % Dot to be as close to the halftone dot % of a basic scale as possible is indicative of a dot-gain quantity. Therefore, as the Yule coefficient n is larger, the dot gain is larger. The equation (22) represents such a relationship. Accordingly, a point where the differences $\Delta X$, $\Delta Y$, $\Delta Z$ vary characteristically with respect to a change in output conditions corresponds to a point of inflection where the rate of increase of the effective halftone dot % Dot with respect to the analyzed halftone dot density Dt is maximum in the equation (22). This point of inflection can be determined by partially differentiating the equation (22) twice with respect to the analyzed halftone dot density Dt.

After nodes Pi of the device data are determined, target output conditions in which the particular output condition is set to a desired output condition are established in a color-predicting LUT correcting device 28 (see FIG. 5), and the color-predicting LUT correcting device 28 determines a color-predicting LUT which represents a target color-predicting conversion relationship with respect to the target output conditions.

Specifically, the color-predicting LUT correcting device 28 first generates a color chart CH1 based on device data that have values 0%, nodes Pi (%), and 100% of a basic scale. The generated color chart CH1 is then colorimetrically measured by a colorimeter 30 to produce colorimetric data X, Y, Z (target colorimetric data) in a step S15.

Figure 10:
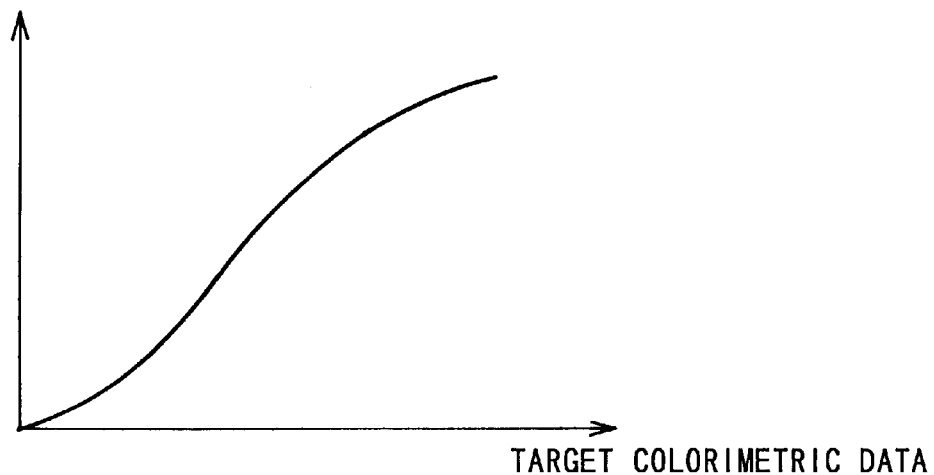
FIG. 10 is a diagram illustrative of a corrective function for obtaining a target color predicting function from a reference color predicting function.
Figure 11:
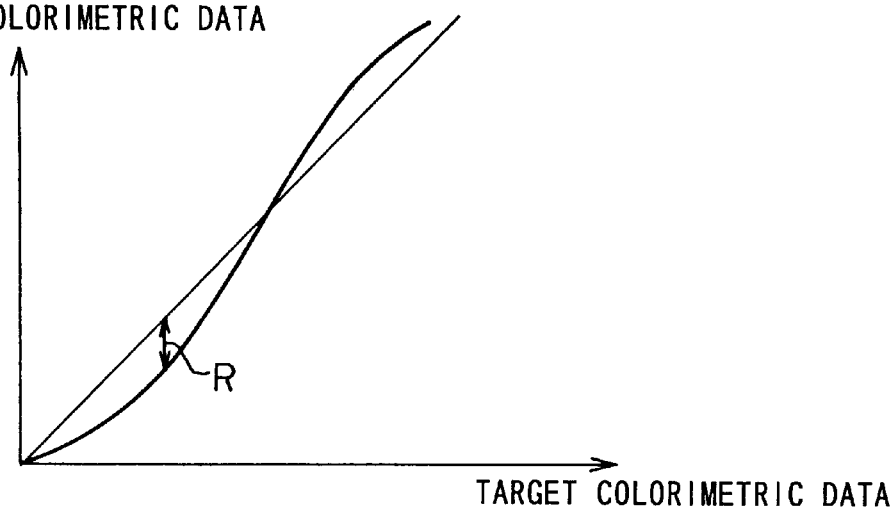
FIG. 11 is a diagram illustrative of a conversion table for converting target colorimetric data into reference colorimetric data.
Figure 12:
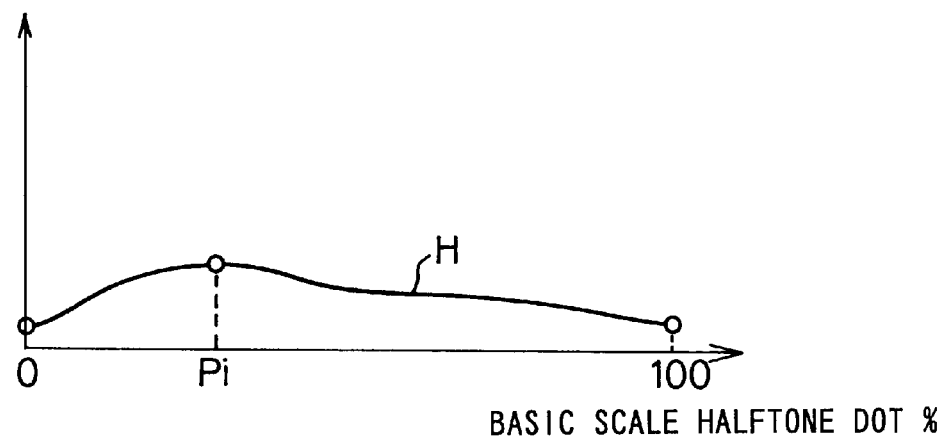
FIG. 12 is a diagram illustrative of the conversion table for converting target calorimetric data into reference colorimetric data.

The reference colorimetric data produced when the color chart CH is colorimetrically measured by the colorimeter 22 and the target colorimetric data produced when the color chart CH1 is calorimetrically measured by the colorimeter 30 have relative colorimetric value deviations as shown in FIG. 10 because the calorimeters 22, 30 do not have completely identical characteristics. In view of this, the colorimetric data X, Y, Z (target colorimetric data) are corrected, i.e., converted into colorimetric data X, Y, Z (reference colorimetric data) which are free of such colorimetric value deviations. The calorimetric data X, Y, Z (target calorimetric data) may be corrected using differences R between the reference calorimetric data and the target colorimetric data, as shown in FIG. 11. By correcting the colorimetric data X, Y, Z (target colorimetric data), it is possible to determine a desired color-predicting LUT with high accuracy even if the system for generating the color-predicting LUT0 with respect to the reference output conditions and the system for generating the color-predicting LUT with respect to the target output conditions are different from each other.

Then, differences ΔX, ΔY, ΔZ (target differences) between the colorimetric data X, Y, Z determined in the step S11 with respect to the device data that have values 0%, nodes Pi (%), and 100% of each basic scale under the reference output conditions and the colorimetric data X, Y, Z determined in the step S15 under the target output conditions are determined in a step S16. The determined differences ΔX, ΔY, ΔZ are linearly interpolated to obtain a corrective function H (corrective relationship) with respect to each basic scale in a step S17.

The corrective function H may be determined by polynomial approximations from differences ΔX, ΔY, ΔZ at three or more points. If accuracy permits, the corrective function H may also be determined from differences ΔX, ΔY, ΔZ at two or less points. If there are a plurality of nodes Pi, then the corrective function H may be determined without using differences ΔX, ΔY, ΔZ at points of 0% and 100%.

Using the corrective function H thus determined, the colorimetric data X, Y, Z with respect to the device data C, M, Y, K of the color-predicting LUT0 under the reference output conditions are corrected for each basic scale for thereby determining a color-predicting LUT highly accurately with respect to the desired target output conditions in a step S18.

Figure 13:
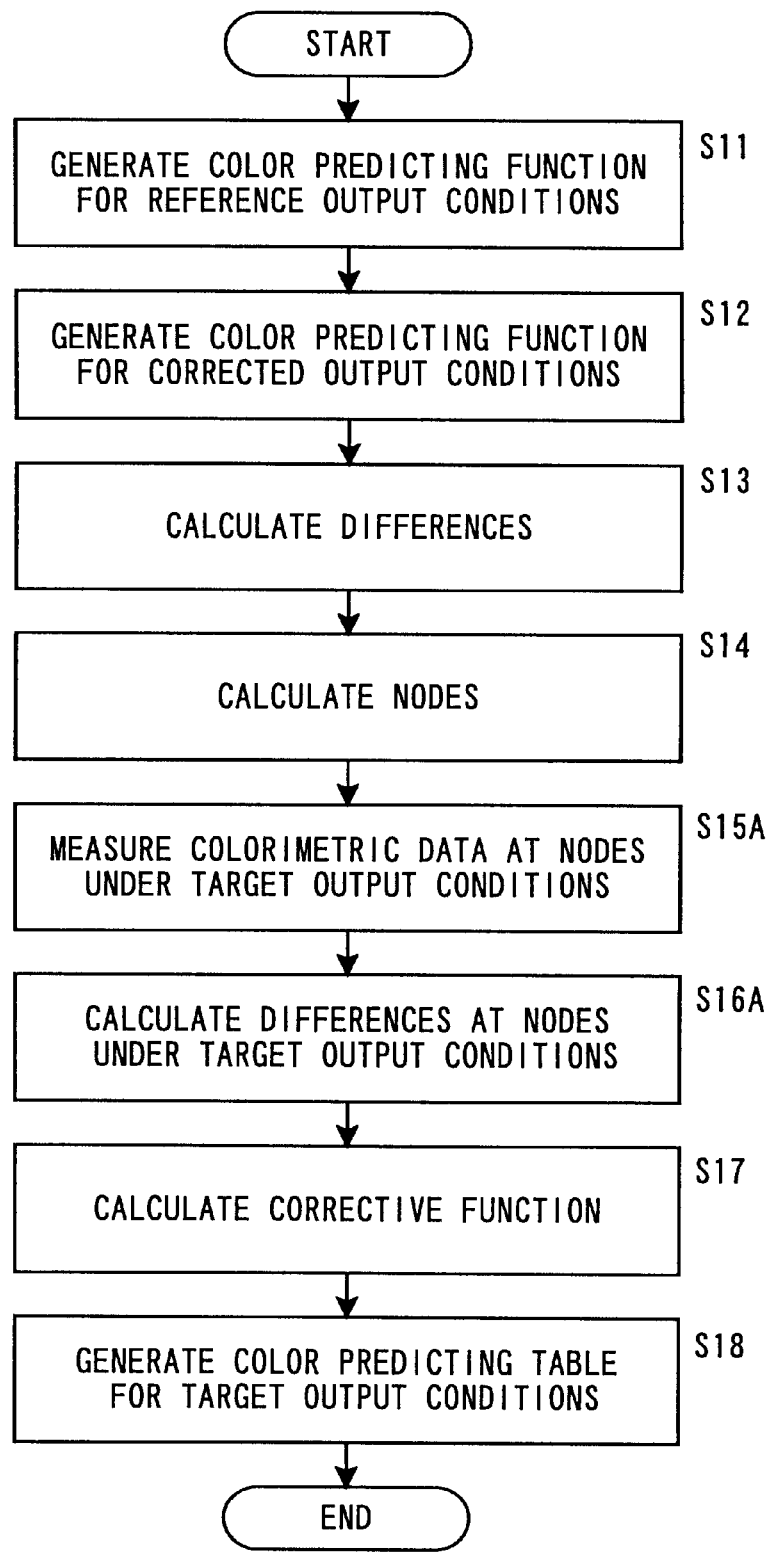
FIG. 13 is a flowchart of a second alternative sequence of the method according to the second embodiment.

A second alternative sequence of the method according to the second embodiment will be described below. The second alternative sequence is carried out according to the apparatus shown in FIG. 5 as modified by the dotted lines and a flowchart shown in FIG. 13. Steps S11–S14, S17, S18 shown in FIG. 13 are identical to those shown in FIG. 6 and will not be described in detail below.

Figure 14:
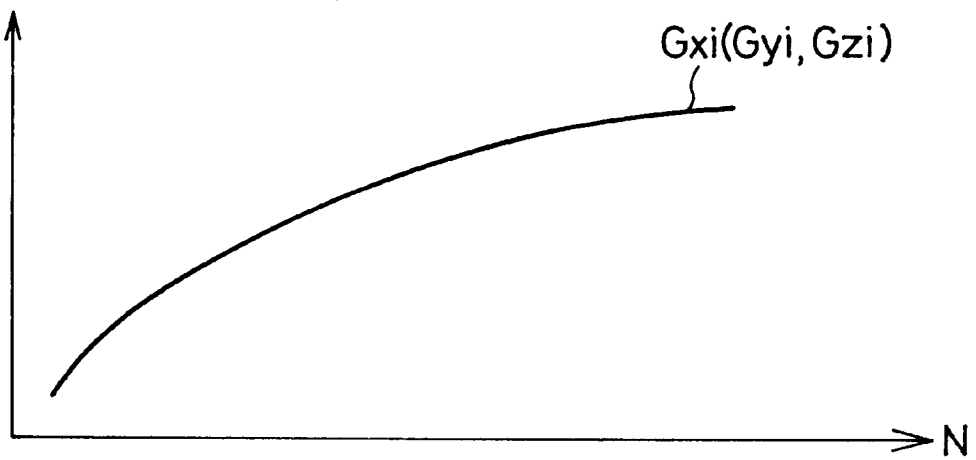
FIG. 14 is a diagram illustrative of a node function for obtaining differences from target output conditions.

After the nodes Pi are determined in the step S14, a node function generating device 32 determines changes in the calorimetric data X, Y, Z at the nodes Pi which result from the modification of the particular output condition. Specifically, the node function generating device 32 determines differences between the reference calorimetric data at the nodes Pi under the reference output conditions and corrected colorimetric data at the nodes Pi under corrected output conditions N where the particular output condition has been corrected, as differences ΔX, ΔY, ΔZ under the corrected output conditions N. The node function generating device 32 determines the differences ΔX, ΔY, ΔZ with respect to a plurality of different sets of corrected output conditions to produce node functions Gxi, Gyi, Gzi which represent the differences ΔX, ΔY, ΔZ for each basic scale under the corrected output conditions N in a step S15A. FIG. 14 shows the node functions Gxi, Gyi, Gzi thus produced. Similarly, the node function generating device 32 determines node functions Gx0, Gy0, Gz0 and Gx100, Gy100, Gz100 with respect to device data that have values 0% and 100% of each basic scale.

When target output conditions are established in the color-predicting LUT correcting device 28, the color-predicting LUT correcting device 28 determines corrected output conditions N with respect to the target output conditions, and determines differences ΔX, ΔY, ΔZ for each basic scale with respect to the corrected output conditions N from the node functions Gxi, Gyi, Gzi, Gx0, Gy0, Gz0, and Gx100, Gy100, Gz100 in a step S16A. In establishing the desired target output conditions, it is not necessary to measure colorimetric data X, Y, Z such as at the nodes, and hence to carry out a colorimetric measurement process, and also not necessary to correct or convert data between the colorimeters 22, 30.

From the determined differences ΔX, ΔY, ΔZ, the color-predicting LUT correcting device 28 determines a corrective function H in the step S17. Thereafter, the color-predicting LUT correcting device 28 generates a color-predicting LUT with respect to the target output conditions using the corrective function H in the step S18.

The color-correcting conversion relationship in the first and second embodiments may be established as a relationship of colorimetric data L*, a*, b* or colorimetric data L*, u*, v* or the like to the device data C, M, Y, K. Furthermore, while the device data C, M, Y, K have been described as halftone dot % data in the first and second embodiments, it is also possible to use device data C, M, Y, K as density data.

Although certain preferred embodiments of the present invention has been shown and described in detail, it should be understood that various changes and modifications may be made therein without departing from the scope of the appended claims.

What is claimed is:

1. A method of establishing a color-predicting conversion relationship, comprising the steps of:

generating a first color chart having a plurality of patches under desired output conditions based on device data C, M, Y of a predetermined data pitch, and calorimetrically measuring said first color chart to produce first calorimetric data with respect to said device data C, M, Y;

generating a second color chart having a plurality of patches under said desired output conditions based on device data C, M, Y, K which comprise part of said device data C, M, Y and device data K of a predetermined data pitch, and calorimetrically measuring said second color chart to produce second calorimetric data with respect to said device data C, M, Y, K;

converting said first colorimetric data with respect to said part of the device data C, M, Y and said second colorimetric data with respect to said C, M, Y, K respectively into first linear spatial data and second linear spatial data which are linear with respect to a physical quantity based on a reflected luminance for thereby determining a linear spatial vector with respect to the same device data C, M, Y from said first linear spatial data to said second linear spatial data;

determining a regression coefficient in a multiple regression equation capable of determining said linear spatial vector with respect to said device data C, M, Y, K from said part of the device data C, M, Y;

determining a linear spatial vector with respect to arbitrary device data C, M, Y, K using said regression coefficient;

converting said linear spatial vector with respect to said arbitrary device data C, M, Y, K into third calorimetric data; and establishing the relationship between said first, second, and third calorimetric data with respect to said arbitrary device data C, M, Y, K as a color-predicting conversion relationship.

2. A method according to claim 1, wherein each of said first and second linear spatial data comprises luminance data.

3. A method according to claim 1, wherein said linear spatial vector has a magnitude standardized by said first linear spatial data and a direction from said first linear spatial data to said second linear spatial data.

4. A method according to claim 1, wherein said output conditions comprise printing conditions including an output sheet of paper, color materials, and printing pressures.

5. A method according to claim 1, wherein said regression coefficient is determined by a method of least squares.

6. A method according to claim 1, wherein said first, second, and third calorimetric data comprise stimulus value data X, Y, Z.

7. A method of establishing a color-predicting conversion relationship, comprising the steps of:

determining a reference color-predicting conversion relationship for converting device data into reference colorimetric data under reference output conditions;

modifying a particular output condition among said reference output conditions to determine a node of the device data where colorimetric data vary characteristically;

determining target calorimetric data from a color chart outputted based on the device data at said node under target output conditions in which said particular output condition is set to a desired output condition;

determining target differences between said reference colorimetric data and said target colorimetric data;

determining a corrective relationship for correcting said reference colorimetric data, from said target differences; and determining a target color-predicting conversion relationship for converting the device data into calorimetric data under the target output conditions, from said corrective relationship.

8. A method according to claim 7, wherein said node is determined by determining corrected calorimetric data from a color chart outputted based on the device data under corrected output conditions in which said particular output condition is corrected, determining corrected differences between said reference calorimetric data and said corrected calorimetric data, and determining device data as said node where said corrected differences vary characteristically.

9. A method according to claim 8, wherein said node comprises device data of a point of inflection of said corrected differences.

10. A method according to claim 7, wherein said corrective relationship is determined by linear interpolation from said target differences at a plurality of points including said node.

11. A method according to claim 7, wherein said corrective relationship is determined for at least each monochromatic data of the device data.

12. A method according to claim 7, wherein said output conditions comprise printing conditions including an output sheet of paper, color materials, and printing pressures.

13. A method according to claim 7, wherein said device data comprise data C, M, Y, K.

14. A method according to claim 7, wherein said calorimetric data comprise stimulus value data X, Y, Z.

15. A method of establishing a color-predicting conversion relationship, comprising the steps of:

determining a reference color-predicting conversion relationship for converting device data into reference colorimetric data under reference output conditions;

modifying a particular output condition among said reference output conditions to determine a node of the device data where colorimetric data vary characteristically;

further modifying said particular output condition to determine a change in the colorimetric data at said node as a node function;

determining target calorimetric data at said node from said node function under target output conditions in which said particular output condition is set to a desired output condition;

determining target differences between said reference calorimetric data and said target calorimetric data;

determining a corrective relationship for correcting said reference colorimetric data, from said target differences; and determining a target color-predicting conversion relationship for converting the device data into colorimetric data under the target output conditions, from said corrective relationship.

16. A method according to claim 15, wherein said node is determined by determining corrected colorimetric data from a color chart outputted based on the device data under corrected output conditions in which said particular output condition is corrected, determining corrected differences between said reference calorimetric data and said corrected colorimetric data, and determining device data as said node where said corrected differences vary characteristically.

17. A method according to claim 16, wherein said node comprises device data of a point of inflection of said corrected differences.

18. A method according to claim 15, wherein said corrective relationship is determined by linear interpolation from said target differences at a plurality of points including said node.

19. A method according to claim 15, wherein said corrective relationship is determined for at least each monochromatic data of the device data.

20. A method according to claim 15, wherein said output conditions comprise printing conditions including an output sheet of paper, color materials, and printing pressures.

21. A method according to claim 15, wherein said device data comprise data C, M, Y, K.

22. A method according to claim 15, wherein said colorimetric data comprise stimulus value data X, Y, Z.

* * * * *